United States Patent [19]

Ahn et al.

[11] Patent Number: 5,439,698
[45] Date of Patent: Aug. 8, 1995

[54] PROCESS FOR MANUFACTURING GASIFIED CANDY

[75] Inventors: Sung Ae Ahn, 1-303, Jangmi 3rd Apartment Sincheon-Dong Songpa-Ku, Seoul, Rep. of Korea; Young Deug Lee, Seoul, Rep. of Korea

[73] Assignee: Sung Ae Ahn, Seoul, Rep. of Korea

[21] Appl. No.: 177,623

[22] Filed: Jan. 5, 1994

[30] Foreign Application Priority Data

Apr. 27, 1993 [KR] Rep. of Korea ............ 93-7110

[51] Int. Cl.⁶ ............................................. A23G 3/00
[52] U.S. Cl. .................................... 426/572; 426/474; 426/660
[58] Field of Search ............... 426/474, 564, 572, 660; 99/474

[56] References Cited

U.S. PATENT DOCUMENTS

| | | | |
|---|---|---|---|
| 3,985,909 | 10/1976 | Kirkpatrick | 426/572 |
| 3,985,910 | 10/1976 | Kirkpatrick | 426/572 |
| 4,001,457 | 1/1977 | Hegadorn | 426/572 |
| 4,282,263 | 8/1981 | Barnes et al. | 426/572 |
| 4,289,794 | 9/1981 | Kleiner et al. | 426/474 |
| 4,837,039 | 6/1989 | Gallart et al. | 426/572 |
| 5,023,098 | 6/1991 | Sumi et al. | 426/474 |
| 5,165,951 | 11/1992 | Gallart et al. | 426/572 |

*Primary Examiner*—George Yeung
*Attorney, Agent, or Firm*—Spensley Horn Jubas & Lubitz

[57] ABSTRACT

The nozzle plate is provided for spraying the candy melt from the first pressure vessel into the second, third, and fourth pressure vessels so as to create maximum contact of the gas and candy melt. Further, the agitation propeller is provided for dispersing again the candy melt sprayed through the nozzle plate. The process according to the present invention comprise spraying the candy melt through the nozzle plate and dispersing again the sprayed candy melt by the agitation propeller. The candy produced has gas content of 4–5 cc/g.

5 Claims, 1 Drawing Sheet

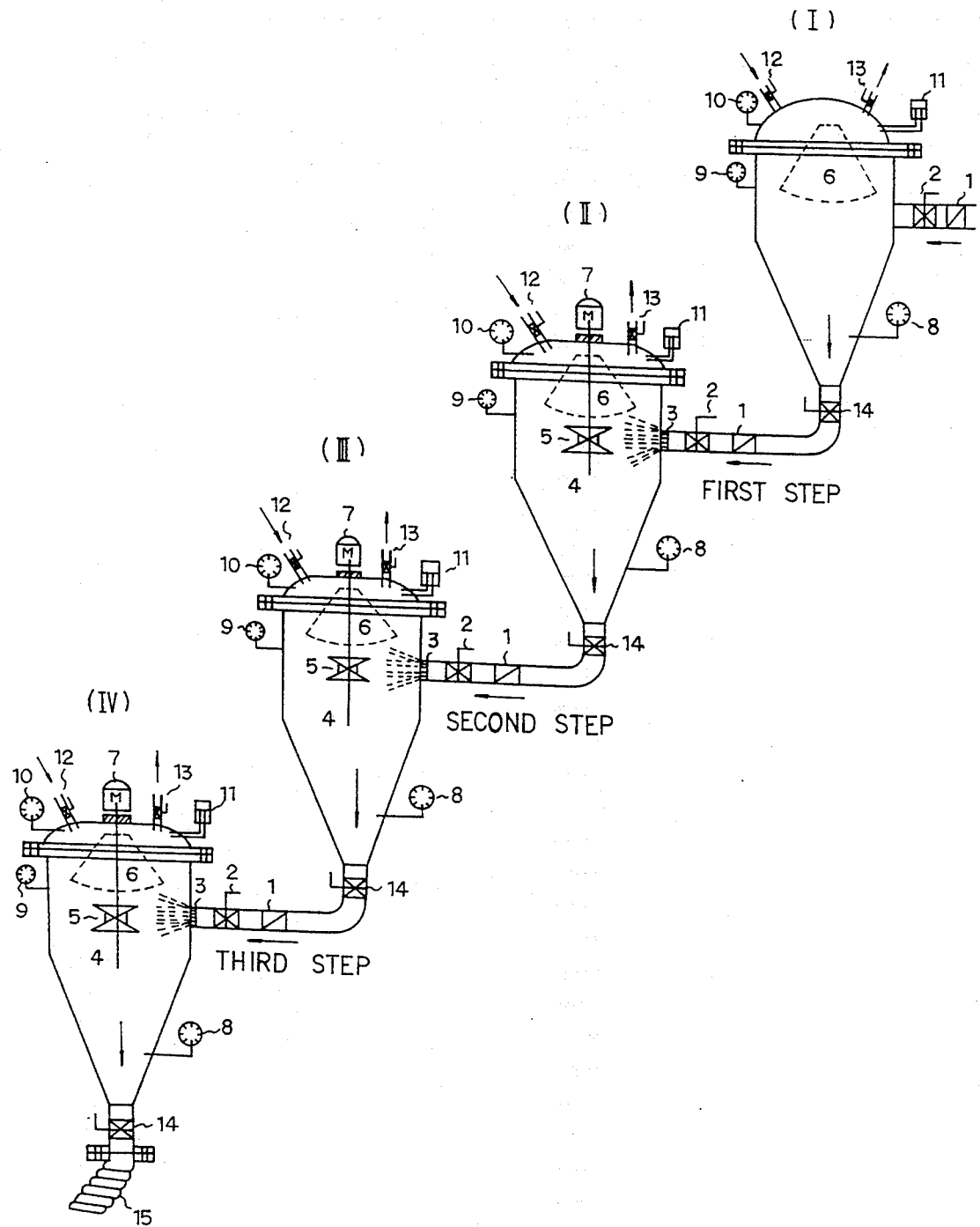

PROCESS FOR MANUFACTURING GASIFIED CANDY

The present invention relates to a process for manufacturing a gasified candy. More especially, the present invention relates to a process for manufacturing a gasified candy comprising spraying the candy melt into the pressure vessels containing the incorporated gas such that the candy produced can contain uniformly impregnated gas.

The present invention also relates to an apparatus which includes nozzle plates for spraying the candy melt into the pressure vessels and an agitating propeller for dispersing the sprayed candy melt.

Finally, the invention relates to the candy obtained using the process and apparatus of the type described.

BACKGROUND OF THE INVENTION

Up to now, many methods and apparatus for gasification of the candy have been developed. For example, there are U.S. Pat. Nos. 3,985,909, 3,985,910, 4,001,457, 4,289,794, 5,165,951, etc. These patents disclose the method and apparatus for manufacturing a gasified candy in which a gas is impregnated into the candy melt, which is introduced through the inlet installed in the upper or middle portions of the pressure vessels, by agitating the candy melt using the agitator under the appropriate temperature and pressure. In these patents, different types of gas introduction methods and agitation methods are used. However, these methods have defects in that the gasification of the candy melt by agitation means only, due to the inherent viscosity of the candy melt, is neither smooth nor consistent. Further, in case a large quantity of gas is introduced, the good quality popping effect cannot be attained and, due to the physical property of the candy composition, the foam state is inferior.

Also, the above-described patents disclose only the method and apparatus for injecting a gas into vessels and the agitation method and apparatus for impregnating a gas into the candy melts within the vessels. Accordingly, there are limits the ability to gasify the candy melt.

Therefore, a method and apparatus have been required to manufacture a candy characterized by a superior popping effect by means of impregnating a higher ratio of gas and, at the same time, a comparably uniform foam state impregnated into a candy.

SUMMARY OF THE INVENTION

According to the present invention, a novel method is provided for manufacturing the candy having the superior popping effect, comprising a) providing four pressure vessels including a first pressure vessel having an interior structure comprised of a gas inlet, a gas outlet, agitation guide plate, candy melt inlet, and candy melt outlet, and second, third, and fourth pressure vessels having an interior structure comprising a nozzle plate mounted in the melt inlet and an agitation propeller, in addition to the structure of the first pressure vessel;

b) introducing the candy melt and gas into the first pressure vessels;

c) spraying the candy melt from the first pressure vessel into the second pressure vessel in which the gas is preintroduced using the pressure difference between the first and second pressure vessels through the nozzle plate mounted in the inlet of the second pressure vessel;

d) dispersing again the candy melt sprayed into the second pressure vessel using the agitation propeller installed in the interior of said vessel thereby creating maximum contact of the candy melt with the gas;

e) repeating process c) and d) using the third and fourth pressure vessels.

Further, it is provided according to the present invention an apparatus for manufacturing the gasified candy, comprising, a) first pressure vessel having a gas inlet and outlet installed in the upper portion of the vessel, an agitation guide plate mounted in the center of the upper portion of the vessel, a candy melt inlet installed in the upper wall of the vessel and a candy melt outlet installed in the bottom of the b) second, third, and fourth pressure vessels having, in addition to the structure of the first pressure vessel, spraying nozzle plates installed in the candy melt inlets of the vessels which spray the candy melt into the vessels through holes installed therein and agitation propeller mounted in the interior center portion of the vessels in front of the nozzle plate which disperses again the candy melt sprayed through the nozzle plate in order to create maximum contact of the gas and candy melt.

Further, it is provided according to the present invention gasified candy obtained by the process and apparatus described above.

The candy melt used in the present invention consists of 30–42 wt % of sugar, 20–25 wt % of maltose, 17–22 wt % of lactose, 10–15 wt % of mixed active ingredients which are powder produced by high temperature resolution of the mixture of sugar, maltose and lactose, 15–25 wt % of water, 0.1–0.2 wt % of perfumes, 0.0010–0.0015 wt % of pigments and 0.0001–0.001 wt % of baking soda. The gas used in the invention is selected from one or more of carbon dioxide, nitrogen and/or oxygen or the mixture thereof.

The pressure vessel is shaped like a circular cone of which the upper portion is wide and the lower portion is narrow. The diameter of the pressure vessel is 100–300 mm, and the gas space for exerting pressure occupies over 30% of the interior of the pressure vessels. The diameter of the holes of the nozzle plate is 0.8–5 mm and the number of holes is 5–40.

The carrying tube in which the candy melts are transferred is composed of a two-layer jacket so as to withstand pressure of 40–60 $kg/cm^2$. The candy melt is transferred by the pressure difference between the pressure vessels and sprayed through the nozzle plate into the vessels at 20–25 $kg/cm^2$ of pressure.

BRIEF DESCRIPTION OF THE DRAWING

Accompanying drawing illustrates the schematic process of the method and apparatus according to the present invention.

DETAILED DESCRIPTION OF THE PREFERRED EMBODIMENT

As can be seen in the drawing, the present invention is composed of an apparatus having four pressure vessels and 3 step processes using said apparatus. The first pressure vessel (I) has the interior structure comprising a gas inlet 12 and outlet 13 installed in the upper portion of the vessel, an agitation guide plate 6 mounted in the upper center portion for dispersing the candy melt uniformly, candy melt inlet 2 installed in the upper side wall and candy melt outlet 14 installed in the bottom bottom portion of the vessel. The second, third, and fourth pressure vessels (II, III, and IV) have an interior structure further comprising a spraying nozzle plate 3 having many holes installed in the candy melt inlet 2 in order to spray the candy melt into the vessels and an agitation propeller 5 installed in front of nozzle plate 3 dispersing again the sprayed candy melt in order to create maximum contact of the gas and candy melt. The respective vessel further comprises the installations necessary for the process, for example, including check valves 1 for preventing the back current of gas and candy melt caused by the pressure difference between the vessels, shaft 4 for supporting agitation propeller 5 and agitation guide plate 6, motor 7 for rotating shaft 4, thermometer 8 indicating the temperature of the candy melt, manometer 9 indicating the steam pressure of the vessels, manometer 10 indicating the gas pressure of the vessels and safety valve 11. The first pressure vessel (I) does not comprise nozzle plate 3, agitation propeller and motor 7 because it serves only to transfer into the second pressure vessel (II) the candy melt, after gasification, transferred from the vacuum cooker. Each vessel is preferably shaped like a cone of which the upper portion is wide and the lower portion is narrow so that the candy melt can be easily concentrated.

It is desirable that the candy melt according to the present invention consists of 39-42 wt % of sugar, 20-25 wt % of maltose, 17-22 wt % of lactose, 10-15 wt % of mixed active ingredients (powder produced by high temperature resolution of the mixture of the sugar, maltose and lactose), 15-25 wt % of water, 0.1-0.2 wt % of perfumes, 0.001-0.0015 wt % of pigments and 0.001-0.001 wt % of baking soda.

If there is a disparity in the above mixing ratios of the candy melt, the gas content fluctuates by more than 2-3 cc/g because the gas content is dependent on the mixing ratios of the candy melt.

The mixture of sugar, maltose, and lactose, formed by the above mixing ratio, is put into a conventional dissolver and heated at a temperature of about 115° C. under 5 kg/cm$^2$ of steam pressure until the water content reaches around 15%. Then, the mixture is transferred to vacuum cooker and heated at the temperature of 140°-150° C. under about 6-9 kg/cm$^2$ of steam pressure until the water content is less than 3%. This mixture is transferred to the first pressure vessel by means of a pump. Then above ratios of perfume, pigment (R40) and baking soda are added to the above mixture through an upper input hole of the vessel. Then, gas inlet 12 is opened to maintain the gas pressure at 45-60 cm$^2$. The gas used in the invention is non-toxic and one of more from carbon dioxide, nitrogen, and/or oxygen, or the mixture thereof may be selected.

The candy melt mixed with the gas in the first pressure vessel (I) is transferred into the second pressure vessel (II) through the carrying tube with two-layer jacket which can withstand the pressure of 40-60 kg/cm$^2$. This transfer is carried using the pressure difference between the vessels. Before the transfer to the second vessel, gas inlet 12 of the second pressure vessel (II) is opened to maintain gas pressure at 30-35 kg/cm$^2$ and candy melt outlet 14 of the second vessel (II) is slowly opened so that the candy melt may be transferred at a high speed resulting from the pressure difference between the two vessels. The candy melt is sprayed at a pressure of 20-25 kg/cm$^2$ through nozzle plate 3 having many holes which is installed in candy melt inlet 2 located in the upper side wall of the second pressure vessel. This spray helps the smooth contact between the melt and the gas. The holes of nozzle plate 3 have a diameter of 0.5-10 mm and the number of holes is preferably 5-40 even though this can be varied depending on the work conditions such as temperature of the candy melt, gas pressure difference and so on.

The sprayed candy melt is dispersed once more by the rotating agitation propeller 5 installed in front of nozzle plate 3. Agitation propeller 8 rotates at 60-600 rpm. The dispersed melt is dropped to the bottom of the vessel. Thus the gas is impregnated for the first time and the first step is completed. In the same manner as the first step, the second and third steps from the second pressure vessel to the fourth pressure vessel are carried out while varying the temperature difference of the candy melt, gas pressure difference and/or the diameter of the holes of nozzle plate 3 and number of holes thereof. Such a repetition process makes possible maximum contact between the candy melt and gas.

The candy melt of which has been processed through the third step is transferred to a cooling pressure vessel which is connected to the fourth pressure vessel by means of a flexible hose. The carrying valve is opened while the pressure of the cooling pressure vessel is maintained at 2-7 kg/cm$^2$ and when a certain amount of the melt is transferred, the pressure difference vanishes. Then the gas outlet of the cooling valve is slightly opened so that the melt can be slowly transferred. When the transfer is completed, the gas inlet is closed and the temperature of the candy melt is cooled to about 30° C. by means of a cooling water of which the temperature is 17°-23° C., while the gas pressure is maintained at 30-40 kg/cm$^2$. It is desirable that cooling water which is produced by a freezer or a cooling tower is used to promote cooling speed. When the temperature drops to below 30° C., the candy melt is discharged by a discharge device. The discharged semi-product is aged for four hours within an aging chamber of which the humidity is 50% and temperature is 25° C. The resulting candy in which a large quantity of gas is impregnated is of various sizes and, therefore, is sorted by a sorter to be packed separately for each class.

The gas content for each class is as follows:

| Class | Distribution Quantity (%) | Gas Content (cc/g) |
| --- | --- | --- |
| Below 4 meshes | 5-10 | less than 1.5 |
| 4-32 meshes | 80-85 | 4-5 |
| Over 32 meshes | 8-12 | less than 1.5 |

As can be seen from the above table, it is apparent that candy produced according to the present invention has a superior gas content. Further, since the percentage of the products of 4-32 meshes which can be used on a commercial scale is about 80-85%, there is also the advantage of minimal product loss

EXAMPLE 9 kg of sugar, 4 kg of maltose, and 5 kg of lactose were mixed. The mixture was heated in the vacuum cooker at a temperature of 140° C. until the water content reached 3.1%. The mixture was transferred to the first pressure vessel by means of a pump. Then 30 mg of perfume (strawberry flavor), 1 g of pigment (R40) and 4 g of baking soda were added to the above mixture through an upper input hole of the vessel. The gas pressure of the first pressure vessel was adjusted to maintain about 60 kg/cm$^2$ of gas pressure and, then, the gas inlet was slowly opened. The gas used was carbon dioxide. Before starting the test, the carrying hose and the pressure vessel were pre-heated at 3 kg/cm$^2$ of steam pressure.

The gas inlet of the second pressure vessel was slowly opened to maintain pressure at around 40 kg/cm$^2$, the inlet being locked thereupon. Then, the candy melt outlet of the first pressure vessel was slowly opened and the candy melt was sprayed into the second pressure vessel through the nozzle plate. The number of holes of the used nozzle plate was 5 and the diameter of the holes was 2.5 mm. After spraying, when the pressure level of the second pressure vessel is the same as that of the first pressure vessel, the gas inlet was closed and the gas of the second pressure vessel was discharged through the gas outlet to maintain the pressure at about 20 kg/cm$^2$ the outlet being locked thereupon.

In the same manner, the second and third steps were carried out using the third and fourth pressure vessels. The number of the holes of the nozzle plate used in the second step was 5 and the diameter was 2 mm, and in the third step was 5 and 1.5 mm, respectively. After the third step was completed, the candy melt was transferred to the cooling vessel and cooled for 150 minutes. Then the pressure of the cooling vessel was discharged and the discharge valve was opened to discharge the final candy products. The produced candies had a good color as well as acceptable structure and shape.

The gas content for each class according to the example is as follows:

| Class | Distribution Quantity (%) | Gas Content (cc/g) |
|---|---|---|
| Below 4 meshes | 5 | 1.5 |
| 4–32 meshes | 85 | 4 |
| Over 32 meshes | 10 | 1.0 |

From the above result, it is noted that the candy manufactured by the method and apparatus according to the present invention contains a high gas content impregnated uniformly and accordingly have a good popping effect. Further, it is also apparent that as the percentage of the products of 4–32 meshes which can be used on a commercial scale is over 80%, there is minimal product loss.

It should be noted that the description and illustration of the invention by way of example, and the scope of the invention is not limited to the exact details shown or described.

We claim:
1. A process for obtaining gasified candy comprising the steps of:
   a) providing four pressure vessels including a first pressure vessel having an interior structure comprising a gas inlet, a gas outlet, agitation guide plate, candy melt inlet, and candy melt outlet, and second, third, and fourth pressure vessels, each of said vessels having an interior structure comprising a nozzle plate mounted in a melt inlet and an agitation propeller, in addition to the structure of the first pressure vessel;
   b) introducing the candy melt and a gas into the first pressure vessel;
   c) spraying the candy melt from the first pressure vessel into the second pressure vessel in which the gas is pre-introduced using the pressure difference between the first and second pressure vessels through the nozzle plate mounted in the inlet of the second pressure vessel;
   d) dispersing again the candy melt sprayed into the second pressure vessel using the agitation propeller installed in the interior of said second pressure vessel thereby creating maximum contact of the candy melt with the gas;
   e) repeating steps c) and d) wherein the third pressure vessel is substituted for the second pressure vessel and the second pressure vessel is substituted for the first pressure vessel; and
   f) repeating steps c) and d) wherein the fourth pressure vessel is substituted for the second pressure vessel and the third pressure vessel is substituted for the first pressure vessel.

2. The process according to claim 1, wherein the candy melt consists of 39–42 wt % of sugar, 20–25 wt % of maltose, 17–22 wt % of lactose, 10–15 wt % of mixed active ingredients, the mixed active ingredients comprising a powder produced by high temperature resolution of a mixture including sugar, maltose and lactose, 15–25 wt % of water, 0.1–0.2 wt % of perfumes, 0.001–0.0015 wt % of pigments and 0.001–0.001 wt % of baking soda.

3. The process according to claim 1, wherein the gas is selected from the group consisting of carbon dioxide, nitrogen, oxygen and mixtures thereof.

4. The process according to claim 1, comprising the step of providing a carrying tube composed of a two-layer jacket so as to withstand pressure of 40–60 kg/cm$^2$.

5. The process according to claim 1, wherein the candy melt is sprayed by the pressure difference between at least one of the first, second, third and fourth pressure vessels through the nozzle plate into at least one of the second, third and fourth pressure vessels at 20–25 kg/cm$^2$ of pressure.

* * * * *